United States Patent [19]

Schwartzburg et al.

[11] 4,201,360
[45] May 6, 1980

[54] INJECTION MOLDING OF EMBOSSED ARTICLES

[75] Inventors: James H. Schwartzburg; Eric A. Little; Eddie A. Wilson, all of Lawrence, Kans.

[73] Assignee: Packer Plastics, Inc., Lawrence, Kans.

[21] Appl. No.: 872,879

[22] Filed: Jan. 27, 1978

[51] Int. Cl.² ............................................. B29C 1/14
[52] U.S. Cl. .................... 249/140; 249/144; 249/154; 264/318; 425/DIG. 58
[58] Field of Search ................ 264/318; 249/140, 144, 249/154; 425/DIG. 58

[56] References Cited

U.S. PATENT DOCUMENTS

| 3,006,030 | 10/1961 | Paull | 264/318 |
| 3,776,683 | 12/1973 | Putzer | 264/318 X |

FOREIGN PATENT DOCUMENTS

| 846793 | 8/1952 | Fed. Rep. of Germany | 264/318 |
| 1118909 | 6/1956 | France | 264/318 |

*Primary Examiner*—Thomas P. Pavelko
*Attorney, Agent, or Firm*—Lowe, Kokjer, Kircher, Wharton & Bowman

[57] ABSTRACT

An embossed article such as a plastic bowl is injection molded between the molding surfaces of an unidirectional mold. The outer molding surface is inclined outwardly from bottom to top and is provided with an engraved area in which the boss is formed. The undercut upper edge of the engraved area is slanted in a manner to provide an inclined lead in surface on the boss. The undercut of the lead in surface is slight enough that the boss is able to release from the engraved area without damage as the mold opens in unidirectional fashion for removal of the molded article.

5 Claims, 4 Drawing Figures

U.S. Patent May 6, 1980 Sheet 2 of 2 4,201,360
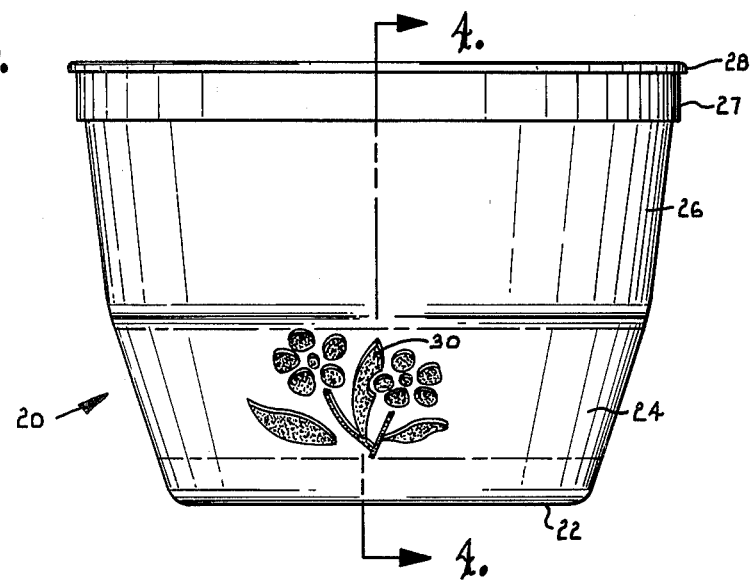
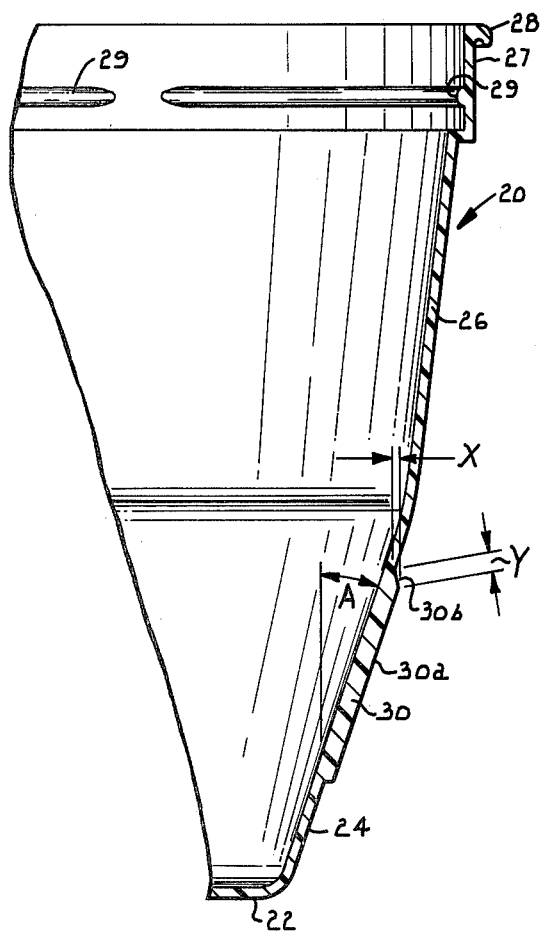

INJECTION MOLDING OF EMBOSSED ARTICLES

BACKGROUND AND SUMMARY OF THE INVENTION

This invention relates generally to the injection molding of plastic articles and deals more particularly with the molding of embossed articles such as plastic containers and the like.

A wide variety of plastic objects are formed by injection molding processes in which liquid plastic resins are injected under elevated temperature and pressure into a mold. The simplest and most economical mold arrangement is one having a cavity section held on a stationary platen and a core section carried on a movable platen which is driven toward and away from the stationary platen to open and close the mold. The mold opens and closes along a central mold axis and is commonly known as a unidirectional mold.

Although the overall simplicity and economy of this unidirectional type of mold makes it desirable for use in as many situations as possible, the shape of the article that can be formed is limited. For example, an article such as a plastic bowl or other container must have side walls which are either parallel with the mold axis or which have a draft angle relative to the axis. Otherwise, the article will engage with the cavity in a manner to remain therein when the mold is opened.

More importantly with respect to the present invention, it has not been possible in the past to effectively form embossed articles with molds of the unidirectional type. Formation of the boss requires that an engraving be cut into the mold surface to receive the material that forms the boss. If the boss is formed in an attractive shape, the upper surface of the engraving presents an "undercut" area against which the top of the boss catches during opening of the mold. Consequently, the article either fails to properly separate from the cavity as the mold opens, or the boss is sheared off or otherwise damaged by the metal cavity piece of the mold.

As a result, it has been the common practice in the past to mold embossed articles with complicated molding equipment that has moving cores or extra directional movement, and the costs have been excessive. It is thus apparent that there is a need for a molding device that is able to mold embossed articles without requiring complex movement of the mold components. The principal goal of the present invention is to meet that need.

More specifically, it is an object of the invention to provide an injection molding device of the unidirectional type which is capable of forming embossed articles such as plastic containers and the like.

Another object of the invention is to provide a molding device of the character described which readily releases the molded article without shearing or otherwise damaging the boss.

A still further object of the invention is to provide a molding device of the character described which is able to mold integral bosses that can be accurately and neatly colored by means of a standard "kiss" type printing process.

An additional object of the invention is to provide an embossed plastic article that is attractive in appearance and can be easily molded on a unidirectional injection molding machine.

Yet another object of the invention is to provide an embossed plastic article wherein each boss has an optimum size and thickness, along with an attractive appearance and an outer surface that can easily be "kiss" printed.

Other and further objects of the invention, together with the features of novelty appurtenant thereto, will appear in the course of the following description of the drawings.

DETAILED DESCRIPTION OF THE INVENTION

In the accompanying drawings which form a part of the specification and are to be read in conjunction therewith, and in which like reference numerals are employed to indicate like parts in the various views:

FIG. 3 is a side elevational view of the molded bowl; and

FIG. 4 is a fragmentary sectional view on an enlarged scale taken generally along line 4—4 of FIG. 3 in the direction of the arrows.

Figure 1:
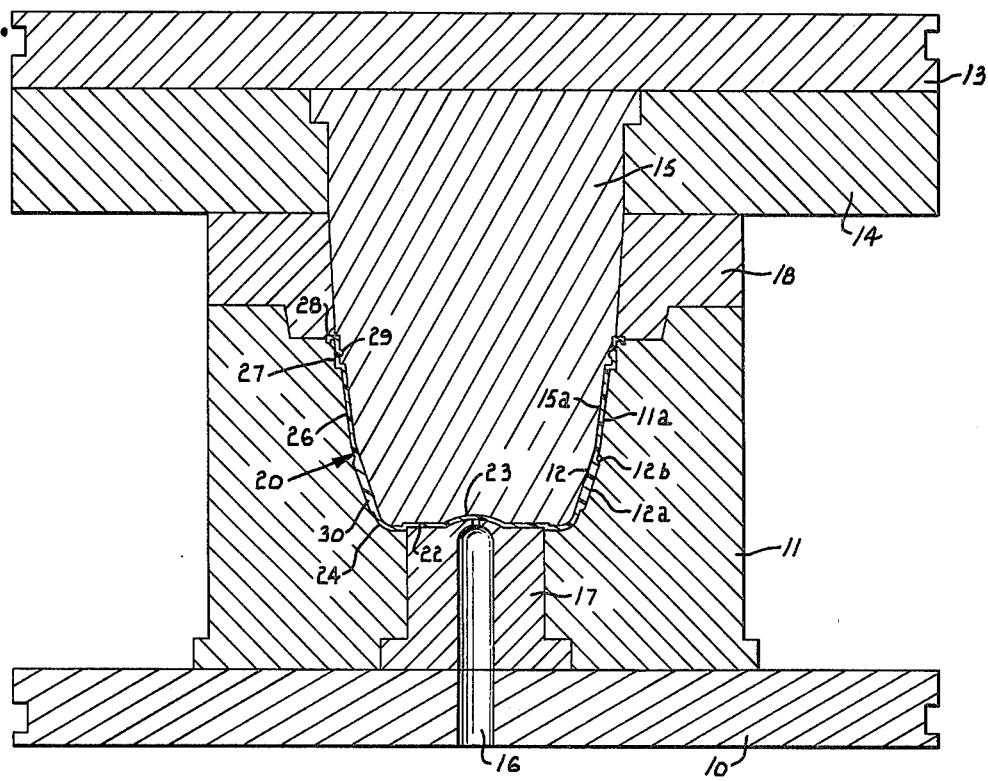
FIG. 1 is a sectional view taken on a vertical plane and showing an embossed plastic bowl which is being formed in a molding device in accordance with the present invention.
Figure 2:
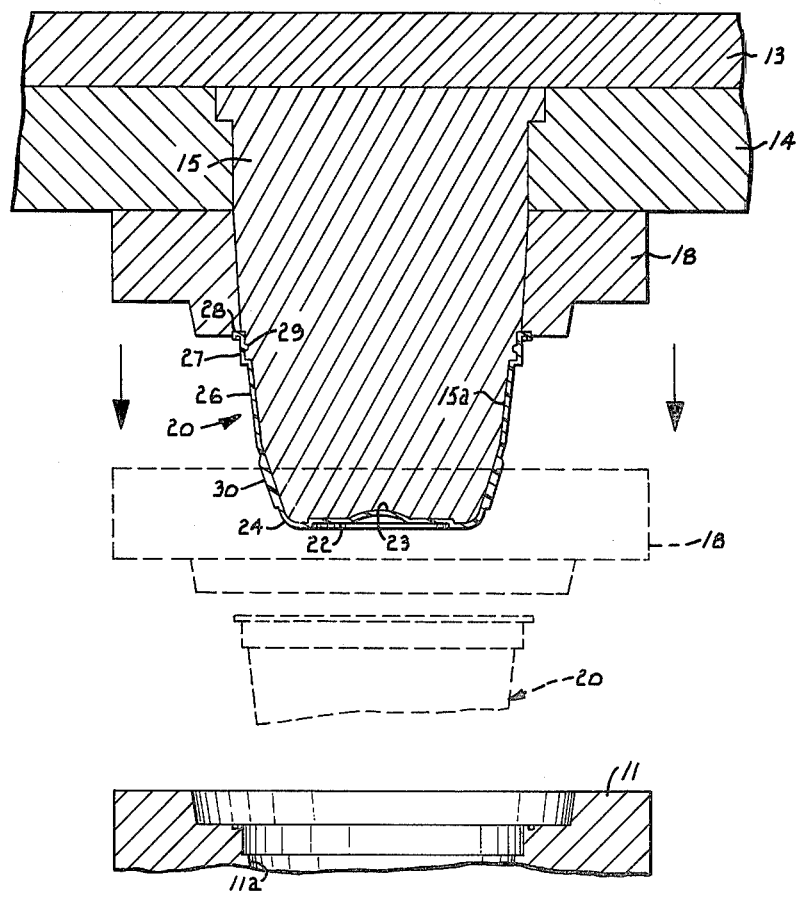
FIG. 2 is a sectional view similar to FIG. 1 but showing the mold in the open position, with the broken lines indicating movement of the stripper ring in a direction to release the bowl from the mold.

Referring now to the drawings in more detail and initially to FIGS. 1 and 2, the injection molding device provided by this invention is constructed for the most part in a conventional manner. A lower stationary platen 10 supports a metal cavity piece 11 presenting therein a mold surface 11a that is contoured in conformity with the outer surface of the article that is to be molded. As will be described in more detail, one or more engraved areas 12 are cut into mold surface 11a.

An upper platen 13 is mounted to move toward and away from the stationary platen 10 while always remaining parallel thereto. The opening and closing movement of the mold occurs solely along a vertical axis extending centrally through the mold and perpendicular to the platens 10 and 13. The underside of platen 13 carries a block 14 to which a metal core piece 15 is secured. The outer surface 15a of core 15 is contoured in a manner to form the inner surface of the article that is to be molded.

When the mold components are closed as shown in FIG. 1, the inner mold surface 15a is spaced inwardly of the outer mold surface 11a in order to present a space therebetween into which liquid plastic resins are injected to form the molded article. The injection of the plastic material occurs through an injection passage 16 that is formed through platen 10 and through a small block 17 that is secured to the cavity piece 11. The upper surface of block 17 is shaped in a manner to form the bottom of the article that is to be molded.

The molding device further includes a stripper ring 18 which is fit around core piece 15 and which may be driven upwardly and downwardly thereon. This movement of ring 18 strips the molded part off of the core, as best shown in broken lines in FIG. 2.

Numeral 20 generally designates an embossed plastic bowl which is molded in accordance with the present invention. The shape of bowl 20 is determined by the contoured molding surfaces 11a and 15a which, along with the engraved areas 12, have specific configurations that permit the bowl to be molded on the unidirectional molding device.

Referring now to FIGS. 3 and 4 in particular, the shape of bowl 20 is shown in detail and is illustrative of the contours of the molding surfaces 11a and 15a. The bowl is symmetrical about a central vertical axis and has a bottom panel 22 which is raised and rounded in the center at 23 (see FIGS. 1 and 2). A continuous lower side wall 24 of the bowl extends upwardly and outwardly from the circular periphery of the bottom panel 22 and makes a draft angle "A" (FIG. 4) with respect to the vertical. In the preferred form of the invention, the draft angle "A" is approximately 19° to 23°, although it may vary throughout a wide range.

From the top end of wall 24, an upper side wall 26 extends upwardly and outwardly at a draft angle that is considerably less than that of the lower side wall. At its upper end portion, bowl 20 has a short vertical wall 27 which terminates in an outturned flange 28 extending around the circular rim of the bowl. A plurality of small beads 29 are formed on the inside surface of wall 27. The purpose of beads 29 is to engage with core piece 15 in a manner to hold the bowl thereon during opening of the mold. Beads 29 are small enough to readily release from core 15 without damage when ring 18 is lowered as shown in broken lines in FIG. 2.

Each engraved area 12 of the mold is shaped in a manner to form an outwardly projecting boss 30 integrally on the outer surface of the lower side wall 24. Boss 30 is formed in an attractive pattern (see FIG. 3) and has a size and shape that permits its release from the mold without damage. With reference to FIG. 4, the boss has a flat outer surface 30a which is parallel with wall 24 and is located outwardly thereof a distance of between 0.017 and 0.023 inch. It has been found that a thickness of the boss less than 0.017 inch results in ink being transferred not only to the boss surface 30a but also to the surface of the adjacent wall 24 during "kiss" printing of the boss by means of a blanket (not shown) used to transfer ink to the boss. Conversely, a boss greater than 0.023 inch in thickness sinks or contracts upon cooling to present irregularities in the boss surface 30a.

In addition to the draft angle "A", separation of boss 30 from the engraved area 12 is facilitated by an inclined upper lead-in surface 30b on the boss. The lower edge of the flat lead-in surface 30b, which adjoins surface 30a, is located below and slightly outwardly of the upper edge of surface 30b, which is adjacent wall 24. Surface 30b is thus an "undercut" surface, and its undercut dimension must be small enough to permit its release from the corresponding undercut surface of the engraved area 12 of the mold. It has been found that the dimension X, which is the distance between the upper and lower edges of the lead-in surface 30b measured in a direction perpendicular to the mold axis, must be no more than about 0.005 inch or the boss will be undercut excessively and will catch in the mold. The dimension Y, which represents the lead-in distance of the length of surface 30b between its upper and lower edges, should be in the range of 0.048 to 0.050 inch with the draft angle and boss thickness indicated above.

Manifestly, the mold surfaces 11a and 15a are shaped in a manner to provide bowl 20 with the shape and dimensions indicated. Thus, the engraved area 12 has a flat base surface 12a (FIG. 1) corresponding to the outer boss surface 30a and has a lead-in surface 12b corresponding in size and shape with the lead-in surface 30b of the boss. Surface 12b inclines inwardly slightly toward the mold axis from bottom to top, and its dimensions and orientation are such that it is able to form the boss lead-in surface 30b described above.

Molding of bowl 20 is achieved by holding the mold closed as shown in FIG. 1 and injecting hot plastic resin under pressure through passage 16 and into the space between the mold surfaces 11a and 15a, as well as into the engraved area 12. After the plastic has solidified, the upper platen 13 is raised to lift the newly formed bowl 20 out of cavity 11 due to the engagement of beads 29 in the corresponding grooves of core 15. By virtue of the draft angle A of wall 24 and the size and orientation of the undercut lead-in surface 30b, boss 30 is able to move straight upwardly and out of the engraved area 12 without being sheared or otherwise deformed.

After bowl 20 has been lifted out of cavity piece 11, it is released from core 15 by the stripper ring 18 which is lowered to the positin shown in broken lines shown if FIG. 2. This movement of ring 18 disengages beads 29 from the grooves in which they are formed, thereby dropping bowl 20 off of the core piece 15. The stripper ring is then returned to the position shown is solid lines in FIG. 2, and the upper platen is lowered again to close the mold (FIG. 1). Additional plastic material is then injected through passage 16 and the molding process is repeated. The flat outer surface 30a of each boss 30 may be colored if desired by a conventional "kiss" printing technique wherein a blanket (not shown) is used to transfer ink onto the outer boss surface.

In actual practice, it has been found that shrinkage and incomplete fill of the engraved area 12 results in boss 30 having a thickness slightly less than the depth of the engraving. Therefore, the actual undercut dimension X is slightly less than the undercut of the corresponding engraving surface 12b, thereby further aiding in the release of the boss from the mold cavity.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described out invention, we claim:

1. Unidirectional, injection molding apparatus for molding a thermoplastic article, said apparatus comprising:

inner and outer nondeformably rigid mold members supported for movement toward and away from one another along a mold axis, said inner and outer mold members presenting respective inner and outer mold surfaces inclined with respect to said mold axis and cooperating to present a space therebetween for receiving thermoplastic material to form a wall portion of the article;

an engraved area in said outer mold surface for receiving thermoplastic material to form a boss integrallly on said wall portion in generally outward projection therefrom; and a lead-in surface of said engraved area inclined with respect to said mold axis and having a first end adjoining said outer mold surface, said lead-in surface having a second end located outwardly of said first end and offset therefrom in the direction of said mold axis, said second end being located outwardly of said first end a short enough distance to permit disengagement of said boss from said lead-in surface during separating movement of said mold members along said mold axis.

2. Apparatus as set forth in claim 1, wherein said second end is located outwardly of said first end a distance no greater than approximately 0.005 inch.

3. Apparatus as set forth in claim 1, including a substantially flat base surface of said engraved area oriented substantially parallel with said outer mold surface and located outwardly thereof a distance of between 0.017 and 0.023 inch.

4. Apparatus as set forth in claim 3, wherein said second end is located outwardly of said first end a distance no greater than approximately 0.005 inch.

5. Apparatus as set forth in claim 1, wherein said lead-in surface has a length between said first and second ends in the range of 0.048 to 0.050 inch.

* * * * *